United States Patent
Carlson

[19]

[11] Patent Number: 6,117,093
[45] Date of Patent: Sep. 12, 2000

[54] PORTABLE HAND AND WRIST REHABILITATION DEVICE

[75] Inventor: J. David Carlson, Cary, N.C.

[73] Assignee: Lord Corporation, Cary, N.C.

[21] Appl. No.: 09/170,766

[22] Filed: Oct. 13, 1998

[51] Int. Cl.[7] .................................................. A63B 21/005
[52] U.S. Cl. ..................................... 601/33; 482/4; 482/5; 482/44
[58] Field of Search .............................. 482/1–9, 44–50, 482/900–902, 92, 106, 108, 110–114; 601/33, 23, 40

[56] References Cited

U.S. PATENT DOCUMENTS

| | | |
|---|---|---|
| 4,471,957 | 9/1984 | Engalitcheff, Jr. . |
| 4,641,832 | 2/1987 | Mattox . |
| 4,765,315 | 8/1988 | Krukowski . |
| 5,015,926 | 5/1991 | Casler . |
| 5,382,373 | 1/1995 | Carlson et al. . |
| 5,460,585 | 10/1995 | Gentry et al. . |
| 5,693,004 | 12/1997 | Carlson et al. . |
| 5,711,746 | 1/1998 | Carlson . |
| 5,816,372 | 10/1998 | Carlson et al. . |

*Primary Examiner*—Glenn E. Richman
*Attorney, Agent, or Firm*—Randall S. Wayland; James W. Wright

[57] ABSTRACT

A device for hand and wrist rehabilitation includes a small, hand-held housing for a magnetic fluid controllable resistance brake. Tool elements that provide a grip for a patient releasably snap onto to a shaft of the brake, and allow the patient to exercise the wrist or hand in a variety of positions. The controllable brake provides fine control of the resistance, which is selected by the user with a knob.

11 Claims, 6 Drawing Sheets

PORTABLE HAND AND WRIST REHABILITATION DEVICE

BACKGROUND AND SUMMARY OF THE INVENTION

The invention is directed to devices for exercising and rehabilitating joints. More particularly, the invention relates to a controllable device for rehabilitation of the hand and wrist.

Joint dysfunction may result from injury, trauma, illness or other causes and usually requires, among other therapies, some physical rehabilitation involving range of motion and strength exercise of the affected joint. Prior devices for joint exercise are large, expensive, stationary machines, and as a result, are typically available only at clinics or therapists' offices. A patient must schedule and make visits to use the machines, which inconveniently requires travel by the patient to the clinic and limits the time and frequency with which a patient can perform rehabilitation. There is a need, therefore, for a rehabilitation device that can be carried to and used at a patient's home or other convenient place.

In addition, hand and wrist injuries are more common today than in past years with the wide spread use of computer keyboards and other devices involving repeated movements with strained hand and wrist positioning. An alternative to the large, expensive rehabilitation devices is desirable for hand and wrist rehabilitation.

The invention provides a device for rehabilitative exercise that includes a portable housing that can be carried by hand for use at a convenient place for the patient. The device includes a controllable resistance device contained within the portable housing, and clamps for mounting the device to a table or other structure.

The housing is of a size that can be carried by hand, and the controllable resistance device and control electronics are relatively light weight, all of which provide a hand-holdable portable device.

According to the invention, the controllable resistance device is preferably a rotary magnetorheological fluid brake having a rotatable disk mounted in a housing with a carrier fluid and dispersed magnetic particles. The device includes a controller that allows the patient to set the level of resistance provided by the brake.

The brake includes a shaft on which a tool providing a grip can be mounted. According to a preferred aspect of the invention, the device includes a plurality of interchangeable tools, each providing a different grip for the fingers and/or hand. In addition, different finger, hand, and wrist movements are provided by the tools. For example, pronation/supination of the wrist is provided by a tool having a cylindrical grip similar to a shovel handle perpendicular to the rotary brake shaft. Abduction/adduction of the hand and wrist is provided by a large disk shaped tool mounted perpendicularly on the shaft, or a bulb similar to a door knob mounted to the shaft. In addition, flexion/extension of the wrist is provided by a tool having a cylindrical grip similar to a bicycle handle aligned with the brake shaft.

According to another aspect of the invention, the tools are releasably mountable to the device with, for example, a spring ball arrangement that allows the tools to be snapped onto a shaft of the resistance device and snapped off the shaft for easy removal.

BRIEF DESCRIPTION OF THE DRAWINGS

The invention will become better understood by reference to the following description in conjunction with the appended drawings, in which.

DETAILED DESCRIPTION OF THE PREFERRED EMBODIMENTS

Figure 1:
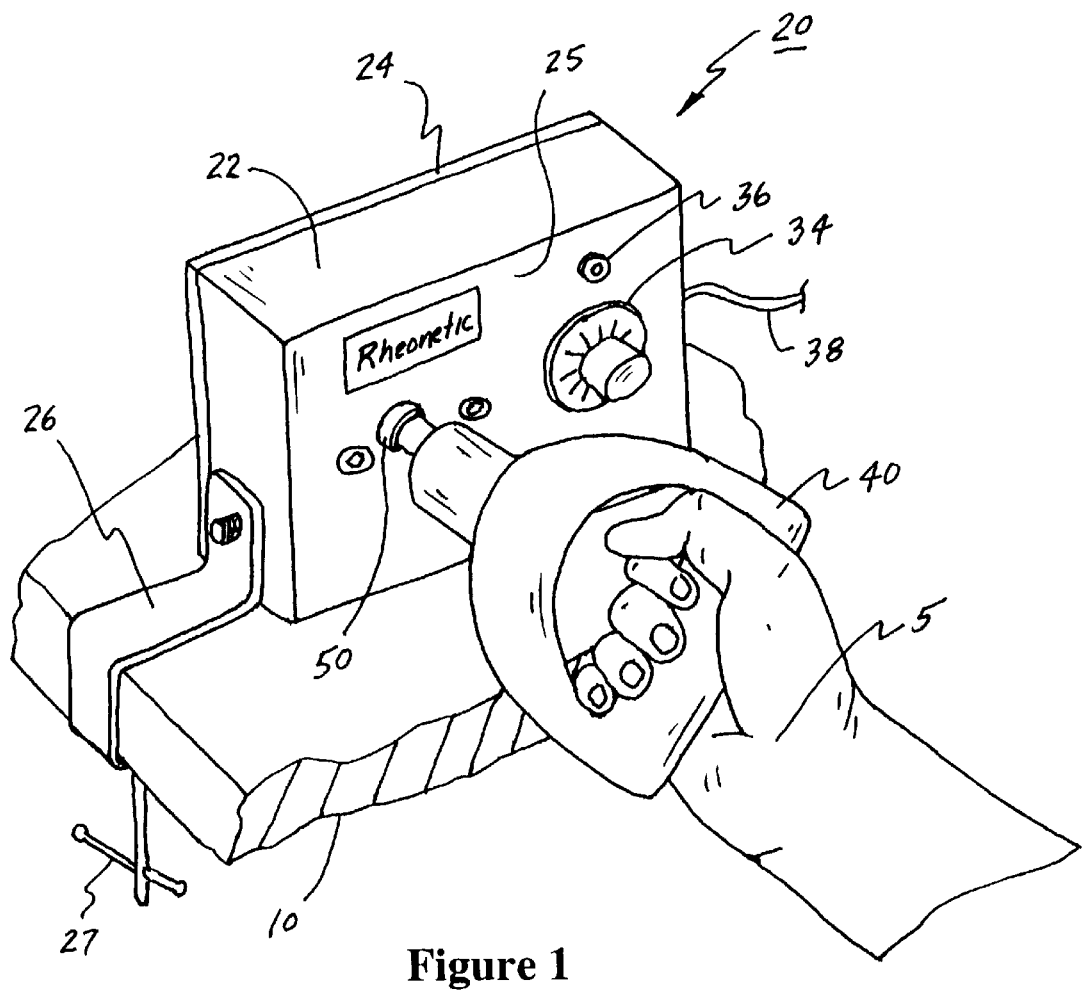
FIG. 1 is a perspective view of a rehabilitation device according to the invention with a first exemplary tool element for exercising pronation and supination of the wrist and forearm.

A portable rehabilitation device 20 for a hand or wrist is shown in FIG. 1. The device 20 includes a housing 22 having a removable back panel 24 and a clamp 26 to mount the device to a table 10 (shown in part) or other similar supporting platform. The housing 22 is relatively small in size to be easily hand-held or hand carried, i.e., it is hand-holdable. A small handle can be provided on the housing 22 to improve portability.

The clamp 26 secures the device 20 to the table 10 so that a user can exercise against resistance provided by the device. The clamp 26 as illustrated is a simple C-shaped clamp that releasably engages the table 10 with a threaded post 27. Other mounting arrangements that provide secure attachment of the housing 22 to a supporting structure may alternatively be used, for example, spring loaded clamps. In addition, for more secure mounting, two clamps can be provided. Moreover, the housing may be mounted in other orientations, such as by laying the back panel 24 directly on the surface of the table 10.

A tool element 40 connects to a shaft 50 extending from a front panel 25 of the housing 22. The shaft 50 is connected to a variable resistance generating device, described below, that provides selectable resistance to rotation of the shaft. The tool element 40 provides a grip for the user and positions the user's hand in an orientation for exercising a specific movement of the fingers, wrist or hand against the resistance supplied by the resistance-generating device.

The resistance level is adjusted by a knob 34 accessible on the front panel 25 of the housing 22. A light emitting diode 36 indicates whether power to the unit is on.

Figure 2:
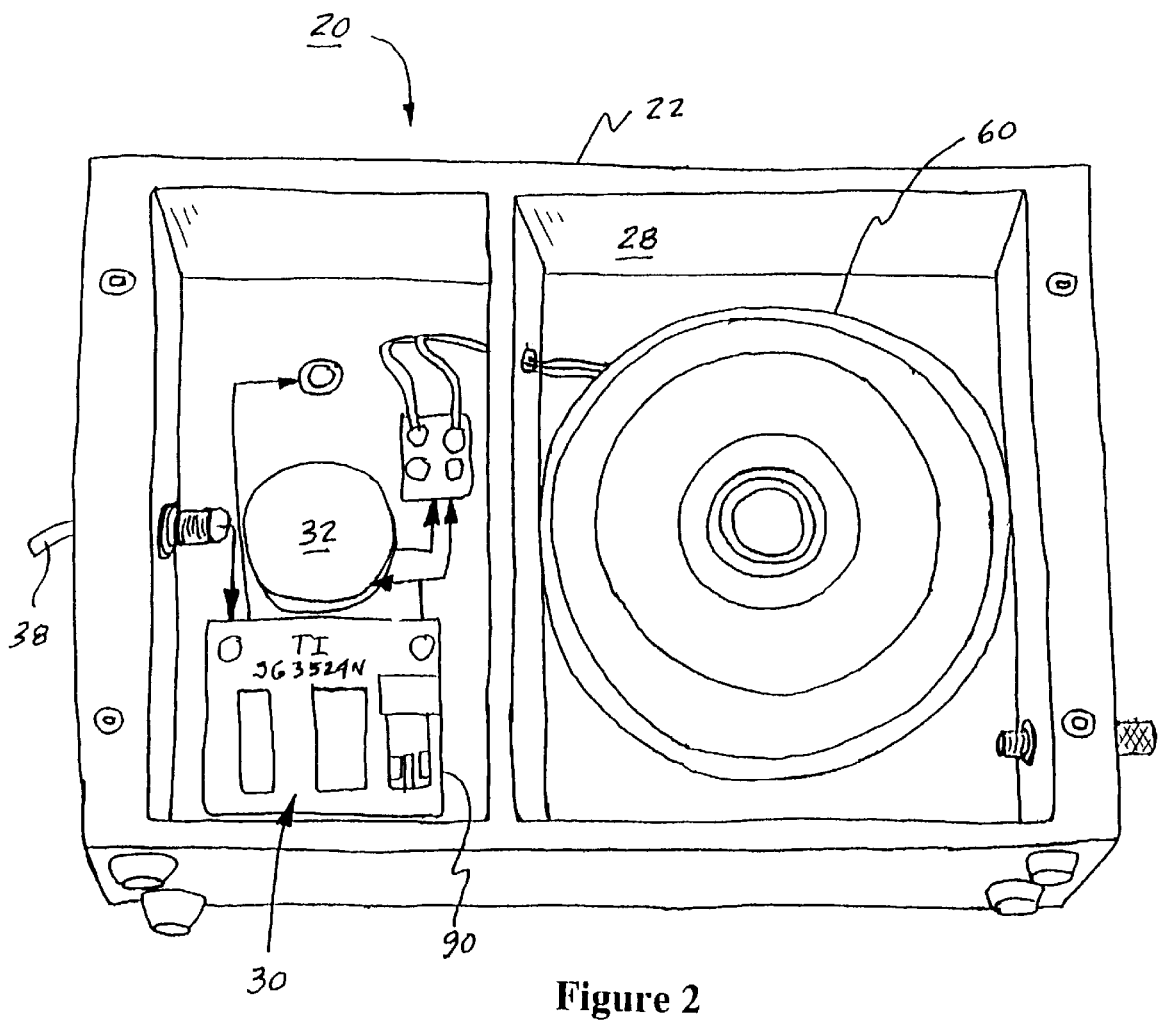
FIG. 2 is a rear view of the device of FIG. 1 illustrating an interior of the housing.

As shown in FIG. 2, the housing 22 defines an interior space 28 for mounting the resistance generating device 60. The resistance device 60 preferably is a magnetically controllable device, described in detail below in connection with FIG. 8.

The control knob 34 connects to an output selector 32 mounted in the housing 24 which selects the output power level supplied by the control circuit (described in connection with FIG. 9, below) to the resistance device 60. The output power energizes the resistance device 60 to provide the selected level of resistance. Power is supplied by a power supply 31 (FIG. 9), such as a DC transformer (not illustrated), conveniently a wall pack such as a Radio Shack model 273-1656 (9 volt) or model 273-1653B (12 volt) that supplies DC power to the device through a power cord 38 (FIGS. 1, 2). Alternatively and preferably, a battery such as Ultralife U9VL lithium battery mounted in the housing 24 supplies power and, by eliminating the power cord 38, provides complete portability of the device 20.

Referring again to FIG. 1, the tool element 40 shown provides a shovel handle-type grip for the user's hand 5 providing a cylindrical grip perpendicular to the shaft 50. Rotation of the tool element 40 on the shaft is made by alternating pronation (turning the palm downward) and supination (turning the palm upward) movements of the hand and wrist, which exercise muscles in the forearm and wrist.

Figure 3:
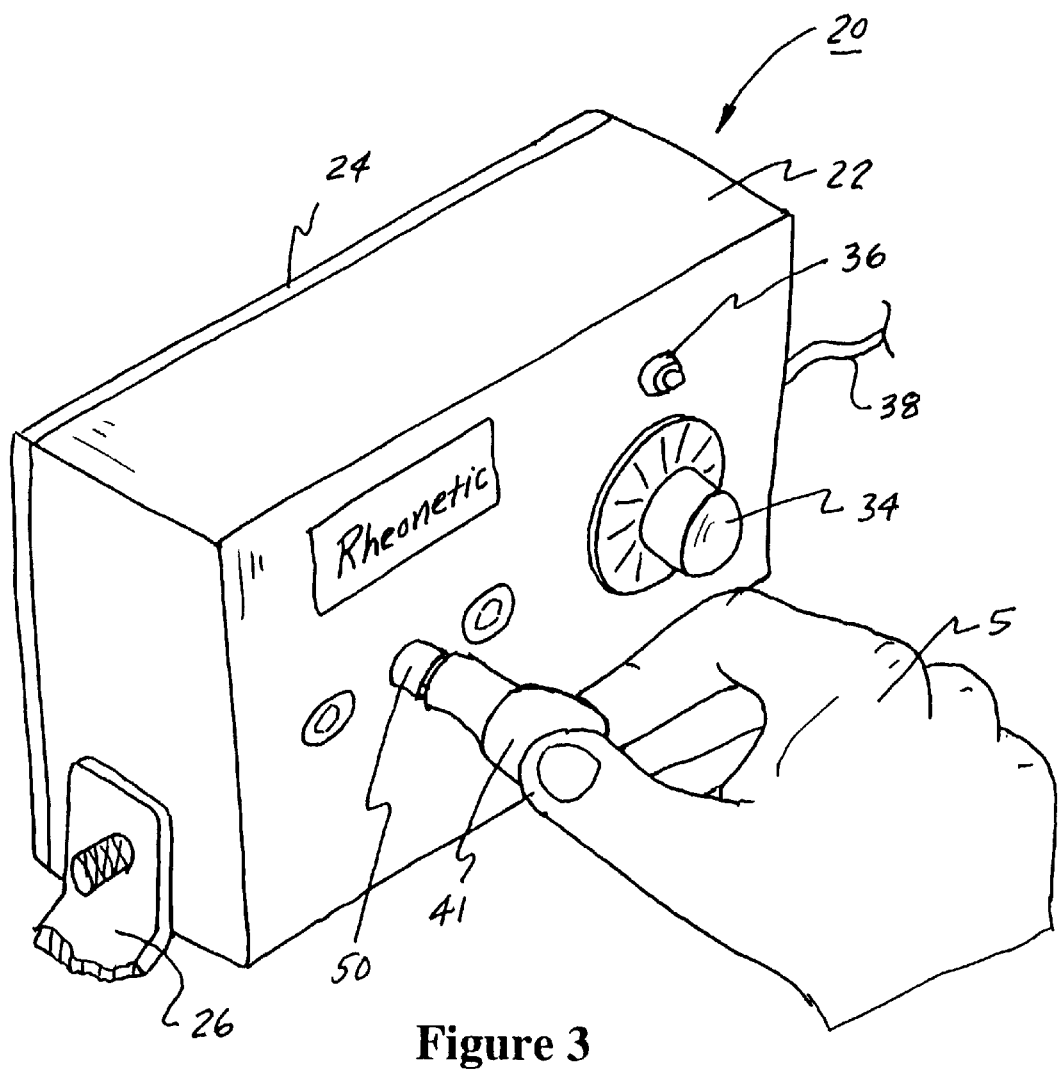
FIG. 3 is a perspective view of the device of FIG. 1 with a second exemplary tool element for exercising fingers.

FIG. 3 illustrates the device 20 with an alternative tool element 41 installed on the shaft 50. This tool element 41 is shaped as a small cylindrical knob to be grasped by the index finger and thumb. Rotation of the small knob tool 41 can be effected by rolling the knob between the finger and thumb to exercise muscles in the hand. In addition, pronation and supination of the wrist can be performed while using the hand muscles to securely grasp the knob 41.

Figure 4:
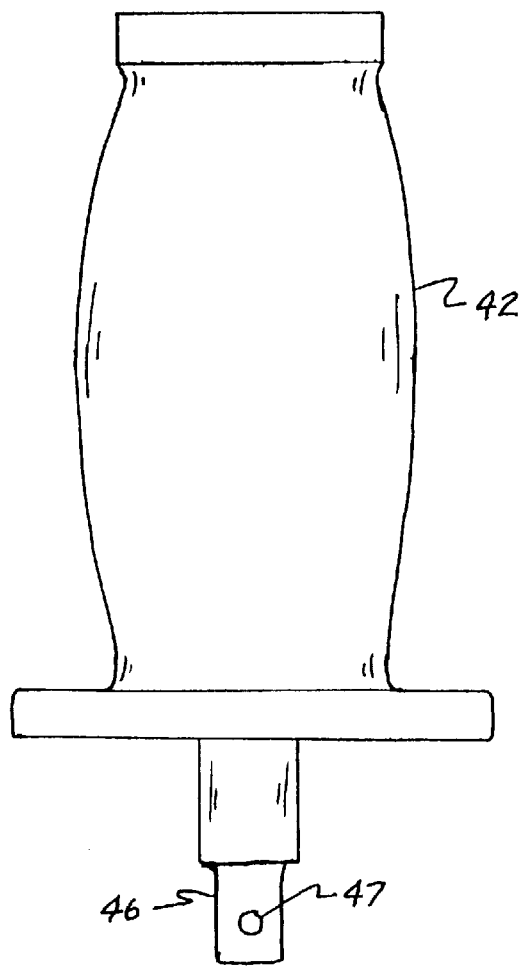
FIG. 4 is a side view of a cylindrical tool element similar to a bicycle handle for flexion and extension movements of the wrist.

Other tool elements can be provided with different grips and different hand positions for exercising other movements. FIG. 4 shows a large cylindrical handle 42, similar to a bicycle handle, that is grasped by the hand with the arm perpendicular to the shaft 50. Rotation of the bicycle handle tool 42 is effected by flexion and extension movements of the hand and wrist.

Figure 5:
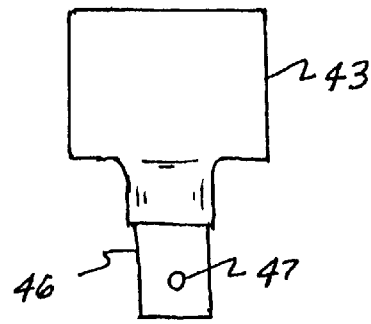
FIG. 5 is a side view of a key-shaped tool element for pronation/supination movements of the wrist and forearm.

FIG. 5 shows a tool element 43 shaped as a key and used similar to the small knob tool element 41 described above. The key-shaped element 43 is grasped between the side of a bent index finger and the thumb, and movement is performed by grasping the key with the hand muscles while exercising the forearm muscles for pronation and supination of the hand and wrist.

Figure 6:
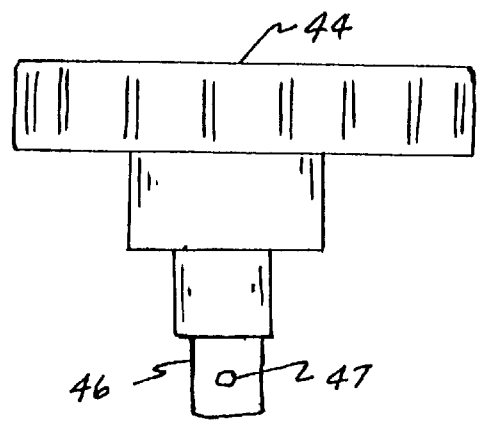
FIG. 6 is a side view of ajar lid-shaped tool element for pronation/supination movements of the wrist and twisting movement of the hand.
Figure 7:
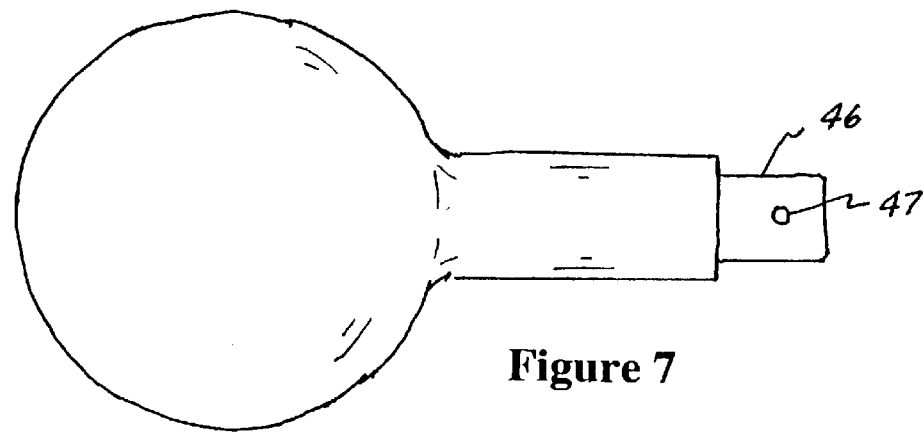
FIG. 7 is a side view of doorknob shaped tool element for pronation/supination movements of the wrist and forearm.

FIG. 6 and FIG. 7 show tool elements useful for using the entire hand for grasping while performing rotation movements of hand itself or the wrist. FIG. 6 shows a large disk 44 that can be grasped in a manner similar to grasping a jar lid. Rotation of the disk 44 can be performed by twisting movement, that is, abduction and adduction, of the hand and fingers relative to the wrist. Alternatively, the disk 44 can be grasped rigidly by the hand and pronation and supination of the wrist performed. FIG. 7 shows a large bulb or sphere 45 resembling a door knob that can be grasped by the fingers alone or the fingers and palm for movements similar to those described for the large disk tool 44.

Other tool element shapes as will occur to those skilled in the art can also be used.

Figure 8:
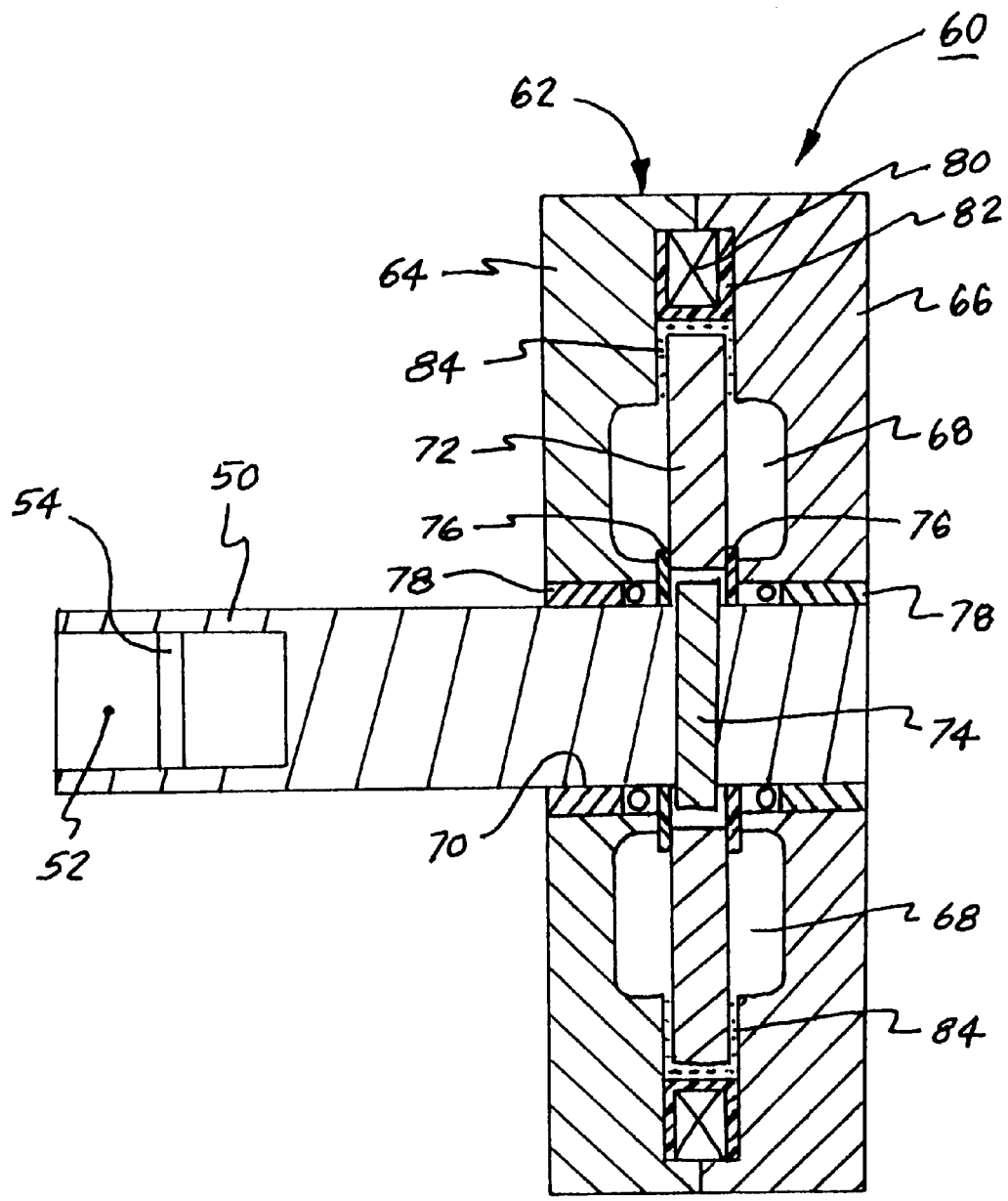
FIG. 8 is a section view of an exemplary resistance-generating device.

The tool elements 40–45 each include a mounting device for quickly connecting and disconnecting the tools on the shaft 50. According to a preferred embodiment, each tool element 40–45 includes a square shaft 46 having a laterally directed spring-loaded ball 47. As shown in FIG. 8, the shaft 50 is formed with a square recess 52 to accept the tool shaft 46, and a groove 54 or cavity formed in the recess allows the ball 47 to snap into place to releasably secure the shaft 46 in the recess. A square shaft end and spring ball arrangement could alternatively be provided on the shaft 50 of the device, and the tool elements formed with a mating recess and groove. Other quick connect and disconnect means can be used as alternatives.

An exemplary resistance generating device 60 is shown in FIG. 8. The device 60 is preferably a rotary controllable fluid brake using a magnetically controlled fluid, such as that described in commonly assigned U.S. Pat. No. 5,711,746 to Carlson, the disclosure of which is incorporated herein. The brake 60 includes a case 62 formed from two parts 64, 66 fastened together and defining an interior cavity 68 for a rotatable disk 72 and having a central hole 70 to receive the shaft 50. The case parts 64, 66 are preferably formed of a magnetically permeable material, such as low carbon steel. The disk 72 is mounted to the shaft 50 with a pin 74 and disposed to rotate in the cavity 68. Washers 76 formed of a low friction material, such as nylon, prevent axial movement of the disk 72 on the shaft 50 to maintain the disk in the rotating position in the cavity 68. Bearings 78 support the shaft for rotation relative to the case 62.

A coil 80 wound on a spool 82 is mounted in the case 62 radially outward of the disk 72 and the cavity 68. The coil 80 is connected to the controller 30 (shown in FIG. 2). When energized, the coil 80 creates a magnetic field that crosses the radially outer parts of the case 62, including the cavity 68, and disk 72. The cavity 68 includes a wider inner recess 69 that helps to concentrate the magnetic field at the outer part near the coil. A magnetically controllable medium 84 is disposed in the cavity 68. The magnetic field causes a change in rheology of the medium 84, which produces resistance to rotation the disk 72. Preferably, the magnetically controllable medium 84 is preferably a magnetorheological fluid such as described in U.S. Pat. No. 5,382,373 to Carlson et al., the disclosure of which is incorporated herein by reference.

Varying the level of current in the coil 80 changes the field strength and thus the rheology of the controllable medium 84, which allows adjustment of the resistance provided by the device 20.

Figure 9:
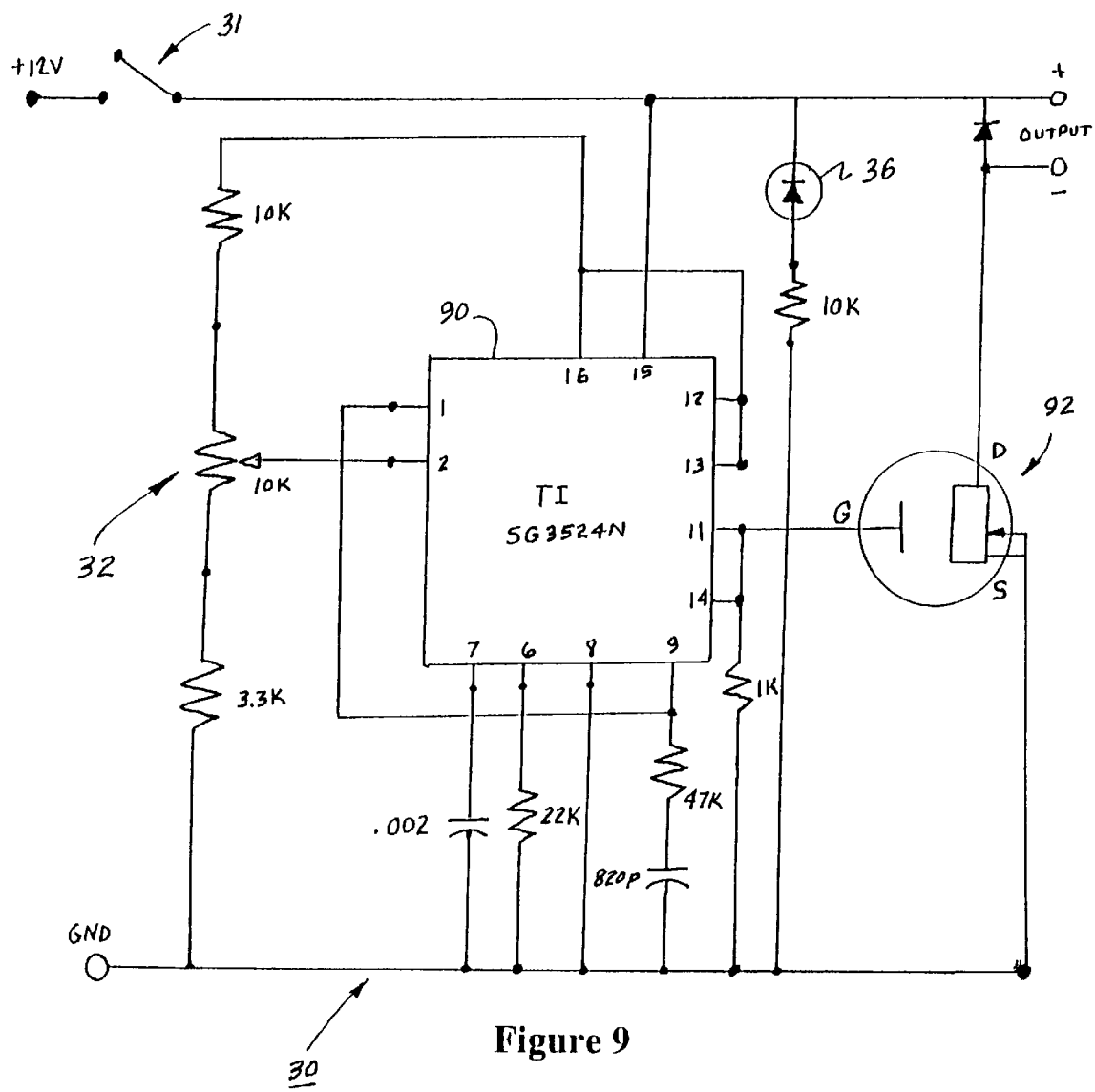
FIG. 9 is a schematic of an exemplary control circuit for the device.

FIG. 9 illustrates an exemplary circuit for the controller 30 for use in controlling the resistance generating device 60. The circuit is a pulse width modulated circuit including a microchip 90 and a field effect transformer 92 that provides a current to the coil 80 (FIG. 8) at a level selected by the output selector 32. The controller 30 converts the input voltage to pulses and controls the output by varying the length of the pulse used for output voltage.

The portability of the device 10 and the ability to secure it to a support advantageously allow the device to be carried to and set up for use where convenient for the patient, for example, at the patient's home. The simple quick connect and disconnect mounts for the various tool elements simplify set up of the device.

The invention has been described in terms of preferred principles and structure; however, the particular examples given are meant to be illustrative and not limiting. Substitutions and equivalents as will occur to those skilled in the art are included within the scope of the invention as defined by the following claims.

What is claimed is:

1. A portable hand and wrist rehabilitation device, comprising:

a portable hand-holdable housing defining an interior space, the housing being of a size to facilitate ease of hand carrying by a user thereof;

a magnetically controllable resistance brake mounted in the interior space, the brake including a case mounted to the housing, a rotor and interconnected rotable shaft supported in the case, the shaft extending through a wall of the housing to an exterior of the housing;

tool means detachably mounted to the rotatable shaft, said tool means being grippable by a user for rotating the shaft; and an adjustable controller for setting a resistance level of the brake, the controller having selector means accessible on an exterior of the housing.

2. The device as claimed in claim 1, further comprising means for releasably securing the housing to a table.

3. The device as claimed in claim 1, wherein said tool means comprises a plurality of interchangeable tools, each tool having a different grip.

4. The device as claimed in claim 1, wherein the magnetically controllable resistance brake comprises the case defining an interior cavity, the case including a magnetically soft outer peripheral flux path, the rotor disposed in the cavity for rotation therein and connected to the shaft, the rotor forming a gap with adjacent surfaces of the case, a magnetically controlled medium contained in the gap, and a coil located adjacent to the rotor and radially inward of the flux path, the coil connected to the controller for generating a magnetic field when energized by the controller.

5. The device as claimed in claim 1, comprising a battery power supply connected to supply power to the controller.

6. The device as claimed in claim 1, comprising a low-voltage transformer connected to supply power to the controller.

7. A portable hand and wrist rehabilitation device, comprising:

a portable hand-holdable housing including a wall, the housing being of a size to facilitate ease of hand carrying by a user thereof;

a magnetorheological brake mounted to the wall, the brake including a case mounted to the housing, a rotable shaft supported in the case, and a rotor mounted to the shaft, the shaft extending from the housing;

a tool detachably mounted to the rotatable shaft, said tool being grippable by a user for rotating the shaft; and an adjustable controller for setting a resistance level of the brake, the controller having selector means accessible on an exterior of the housing.

8. The device as claimed in claim 7, wherein said tool comprises a plurality of interchangeable tools, each tool having a different grip.

9. The device as claimed in claim 7, comprising a battery power supply connected to supply power to the controller.

10. The device as claimed in claim 7, comprising a low-voltage transformer connected to supply power to the controller.

11. A portable hand and wrist rehabilitation device, comprising:

a portable hand-holdable housing including a first portion including a wall and a second portion mounted thereon, the housing being of a size to facilitate ease of hand carrying for home use by a user and including an interior space;

a magnetorheological brake mounted to the wall in the interior space, the brake including a case mounted to the housing, a rotable shaft supported in the case, and a rotor mounted to the shaft, the shaft extending from the housing;

a tool detachably mounted to the shaft, the tool being grippable by a user for rotating the shaft; and an adjustable controller mounted to the housing for setting a resistance level of the brake, the controller having selector means accessible on an exterior of the housing.

* * * * *